United States Patent
Gonzales

(10) Patent No.: US 12,439,906 B2
(45) Date of Patent: Oct. 14, 2025

(54) PESTICIDE STRIP, KIT, AND METHODS OF USE

(71) Applicant: Jerina Carmen Gonzales, Ontario, CA (US)

(72) Inventor: Jerina Carmen Gonzales, Ontario, CA (US)

( * ) Notice: Subject to any disclaimer, the term of this patent is extended or adjusted under 35 U.S.C. 154(b) by 1002 days.

(21) Appl. No.: 17/094,400

(22) Filed: Nov. 10, 2020

(65) Prior Publication Data

US 2021/0137093 A1    May 13, 2021

Related U.S. Application Data

(60) Provisional application No. 63/034,238, filed on Jun. 3, 2020, provisional application No. 62/933,493, filed on Nov. 10, 2019.

(51) Int. Cl.

| A01M 1/20 | (2006.01) |
|---|---|
| A01N 25/34 | (2006.01) |
| A01N 35/02 | (2006.01) |
| A01N 37/10 | (2006.01) |
| A01N 59/00 | (2006.01) |
| A01N 59/08 | (2006.01) |
| A01N 65/22 | (2009.01) |
| B32B 3/26 | (2006.01) |
| B32B 7/12 | (2006.01) |

(52) U.S. Cl.
CPC .............. *A01M 1/20* (2013.01); *A01N 25/34* (2013.01); *A01N 35/02* (2013.01); *A01N 37/10* (2013.01); *A01N 59/00* (2013.01); *A01N 59/08* (2013.01); *A01N 65/22* (2013.01); *B32B 3/266* (2013.01); *B32B 7/12* (2013.01); *A01M 2200/011* (2013.01); *B32B 2405/00* (2013.01)

(58) Field of Classification Search
CPC .......... A01N 25/10; A01N 25/34; A01M 1/20
See application file for complete search history.

(56) References Cited

U.S. PATENT DOCUMENTS

| 4,562,794 | A | * | 1/1986 | Speckman | ............. A01K 13/00 |
|---|---|---|---|---|---|
| | | | | | 119/156 |
| 2006/0089067 | A1 | * | 4/2006 | Baker | ....................... B32B 5/02 |
| | | | | | 442/62 |
| 2006/0201053 | A1 | * | 9/2006 | Voris | ....................... A01M 1/24 |
| | | | | | 43/124 |
| 2014/0352630 | A1 | * | 12/2014 | Messina | ................. A01N 31/02 |
| 2015/0044267 | A1 | * | 2/2015 | Gray | ....................... A61F 13/00 |
| 2018/0049432 | A1 | * | 2/2018 | Tan | ......................... A01N 25/34 |
| 2018/0279606 | A1 | * | 10/2018 | Yamashia | .............. A01N 25/34 |
| 2019/0239501 | A1 | * | 8/2019 | Manhas | ................ A01M 13/00 |

* cited by examiner

*Primary Examiner* — Joshua J Michener
*Assistant Examiner* — Henry Hooper Mudd
(74) *Attorney, Agent, or Firm* — Foley & Lardner LLP

(57) ABSTRACT

A pesticide strip, pesticide kit, and methods of use thereof are described according to various implementations. The pesticide strip may include at least a first side and a second side, wherein at least one of the first side or the second side further comprises an adhesive. The strip further may include a plurality of pesticides each targeting different pests arranged separately along a longitudinal axis and housed in refillable wells on the pesticide strip. The pesticide kit further includes an applicator and rolling mechanism for application and reuse of the strip. Methods of using the strip include applying it to any two- or three-dimensional geometry, including areas typically precluded from pesticide use.

16 Claims, 3 Drawing Sheets

PESTICIDE STRIP, KIT, AND METHODS OF USE

CROSS-REFERENCE TO RELATED PATENT APPLICATIONS

This application claims priority to U.S. Provisional Patent Application Ser. No. 63/034,238, entitled "PESTICIDE STRIP, KIT, AND METHODS OF USE," filed Jun. 3, 2020, and claims priority to U.S. Provisional Patent Application Ser. No. 62/933,493, filed Nov. 10, 2019, the contents of all such applications being hereby incorporated by reference in their entirety and for all purposes as if completely and fully set forth herein.

FIELD OF THE INVENTION

The present disclosure relates generally to pesticides and insecticides, and more particularly to pesticide strips, tapes, kits, and methods of use thereof.

BACKGROUND

Pesticides are typically designed to be single-use, incorporate toxic constituents, and to be of limited duration for shelf-life and efficacy. Moreover, existing pesticide and insecticide systems are typically aerosols or traps, each of which have significant limitations. Aerosols dissipate quickly, are highly toxic if inhaled, and are easily washed away when contacted by water or excess moisture. Traps typically maintain potency longer than aerosols, but are generally stationary and can only be applied to two-dimensional floor surfaces and are not, for example, easy to apply to boxes, doorways or hanging objects. Moreover, most traps are also designed for a single use. Thus, there exists a need for a pesticide strip and system that is easy to apply on any surface or geometry, maintains efficacy for long periods of time, and can be reused or re-filled with easy to acquire household goods.

SUMMARY

Example implementations include a pest repellant apparatus with a planar material having a first side and a second side, an adhesive material disposed on at least one of the first side and the second side, and a plurality of pesticides arranged separately along a longitudinal axis of at least one of the first side or the second side, where each of the plurality of pesticides targets different pests.

Example implementations also include a pest repellant system with a planar material having a first side and a second side, an adhesive material disposed on at least one of the first side and the second side, a plurality of pesticides arranged separately along a longitudinal axis of at least one of the first side or the second side, a plurality of wells disposed on the planar material along the longitudinal axis of at least one of the first side and the second side, and an applicator configured to distribute pesticides into the wells for reuse.

Example implementations also include a method for pest abatement, including spooling, on a rolling mechanism, a planar material having a first side and a second side, and a plurality of pesticides in a plurality of wells arranged separately along a longitudinal axis of at least one of the first side or the second side, and adhering, at an adhesive material disposed on at least one of the first side and the second side, the planar material to a surface. Example implementations further include a method including refilling the wells after ingestion of at least one of the pesticides by at least one pest.

DETAILED DESCRIPTION

Figure 1:
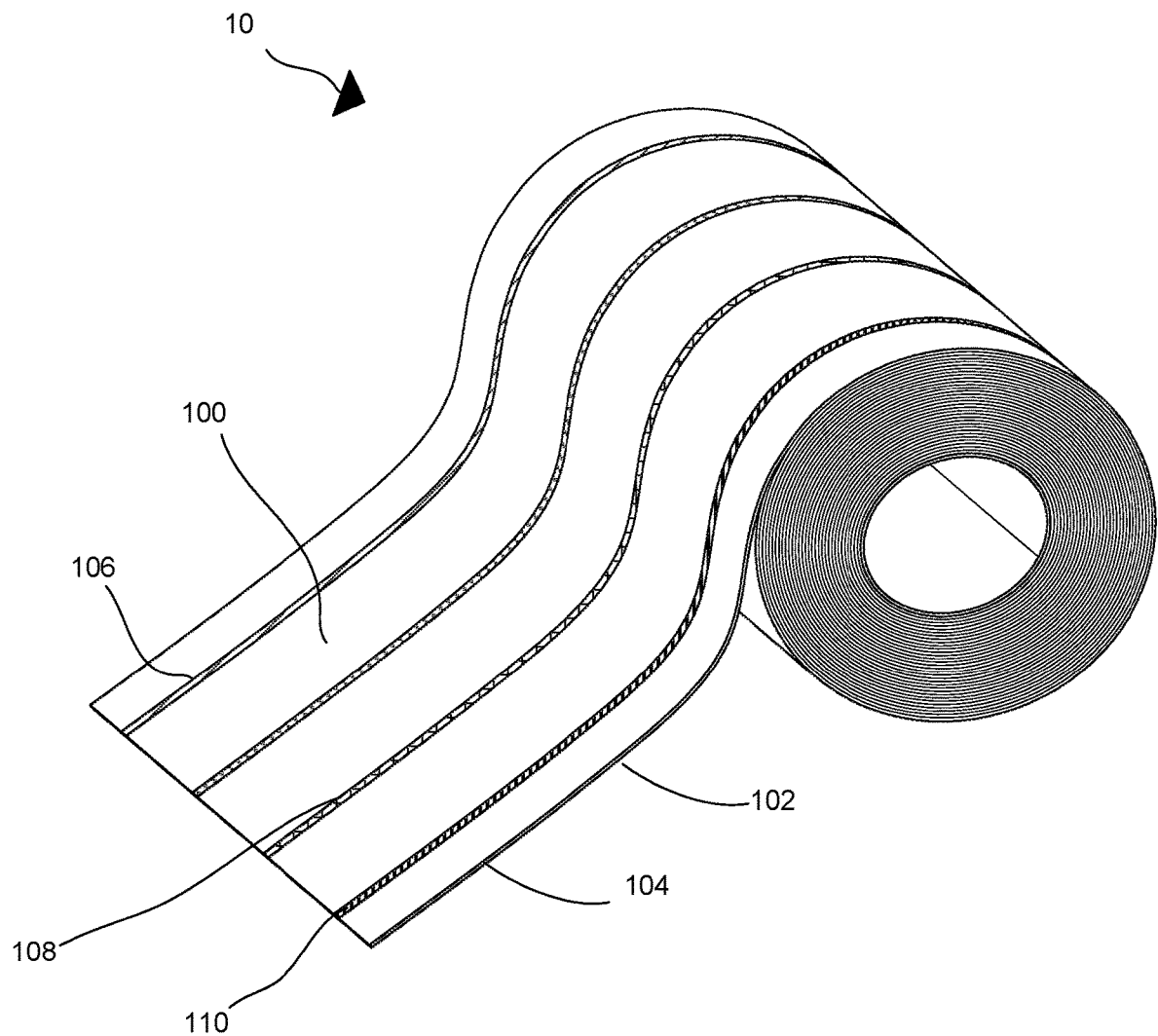
FIG. 1 shows an exemplary view of a pesticide strip of the present disclosure.

Before turning to the figures, which illustrate certain exemplary implementations in detail, it should be understood that the present disclosure is not limited to the details or methodology set forth in the description or illustrated in the figures. It should also be understood that the terminology used herein is for the purpose of description only and should not be regarded as limiting.

Definitions

Unless defined otherwise, all technical and scientific terms used herein generally have the same meaning as commonly understood by one of ordinary skill in the art to which this technology belongs. As used in this specification and the appended claims, the singular forms "a", "an" and "the" include plural referents unless the content clearly dictates otherwise. For example, reference to "a cell" includes a combination of two or more cells, and the like. Generally, the nomenclature used herein and the laboratory procedures in cell culture, molecular genetics, organic chemistry, analytical chemistry and nucleic acid chemistry and hybridization described below are those well-known and commonly employed in the art.

As used herein, the term "about" in reference to a number is generally taken to include numbers that fall within a range of 1%, 5%, or 10% in either direction (greater than or less than) of the number unless otherwise stated or otherwise evident from the context (except where such number would be less than 0% or exceed 100% of a possible value).

As used herein, the term "applicator" refers to a device or implement that facilitates the insertion of a pesticide, including insecticides, into one of the wells of the present disclosure. Exemplary applicators may include, but are not limited to, telescoping tubes, plungers, syringes, and compact applicators.

As used herein, the term "attractant" may refer to a chemical or material used to draw the target pests and insects toward the pesticide strip. Non-limiting examples of attractants may include sugars or glucose solutions or molasses or residual solution containing sugar. It is also possible to use 0.0-dimethyl-2,2,2-trichloro-1 hydroxy ethyl phosphonate) mixed with sugar. Other non-limiting examples of attractants may include any pheromones, plant volatiles, flower oils, sugars and proteins that mimic insect attraction systems found in nature.

As used herein, the phrase "effective amount" includes the amount of pesticide (including insecticides), which alone and/or in combination with other constituents, results in the death of target pests upon contact, ingestion, consumption, or presence of the pesticide.

As used herein, "nontoxic" may refer to any chemical, material, or substance that does not have a poisonous or sickening effect on vertebrate organisms, including mammals, when ingested in low doses.

As used herein, the term "well" may include any opening, lumen, or central cavity of a tubular or other hollow structure configured to house pesticides of the present disclosure. In certain exemplary implementations, wells may be sized anywhere from 50 μm to 500 mm in diameter, or any diameter appropriately sized to encircle both fleas and cockroaches.

Referring generally to the figures, an improved pesticide strip, pesticide kit, and method of use are described. The strip provides an easy to apply pesticide designed to deter and kill unwanted pests, including insects. In some implementations, the pesticide kit may further be configured as a refillable system with commonly owned or easy to acquire insecticides. Among the features, the pesticide strip, pesticide kit, and methods of use can be applied to a multitude of surfaces and, due to the adhesive nature, the strip may be applied to almost any surface that may attract pests.

Pesticide Strip

In one aspect of the present disclosure, a pesticide strip is described. Referring to FIG. 1, pesticide strip 10 may comprise, or consist essentially of, or yet, further consist of first side 100 and second side 102, wherein at least one of the first side 100 or the second side 102 further comprises an adhesive 104. Strip 10 may further comprise a plurality of pesticides 106 each targeting different pests arranged separately along longitudinal axis 108 of either first side 100 or second side 102 of strip 10. In some implementations, strip 10 may be a tape. In certain exemplary implementations, plurality of pesticides 106 may include insecticides.

Figure 2:
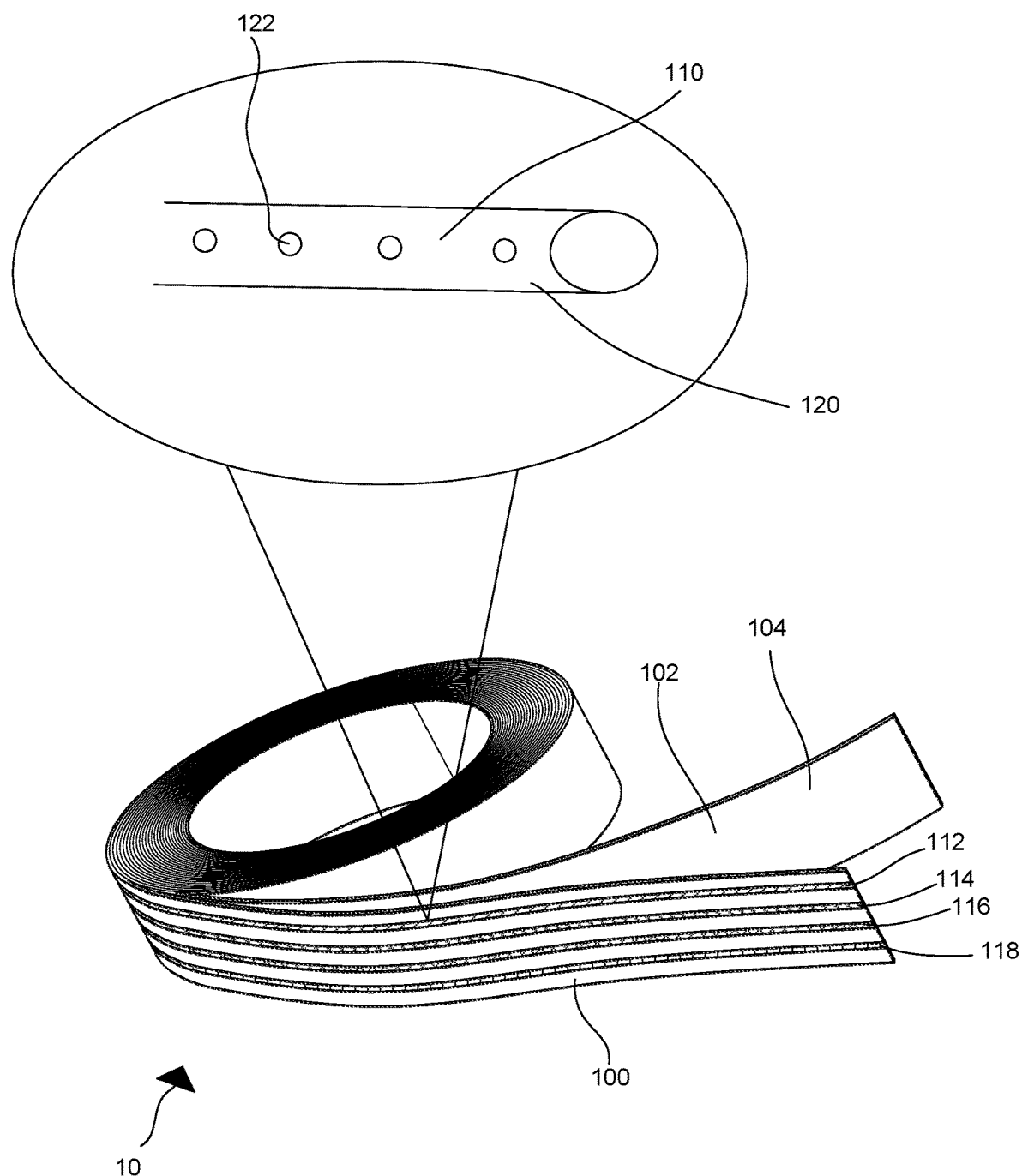
FIG. 2 depicts an exemplary expanded view of the pesticide strip with an adhesive shown and wherein a well configured to contain pesticide is shown in detail in the inset.

Referring again to FIG. 1, and as well to FIG. 2, strip 10 further may comprise a plurality of wells 110 along longitudinal axis 108. Wells 110 may contain a pesticide, further wherein an effective amount of pesticides are accessible from the plurality of wells 110 by an insect. In some implementations, wells 110 may be sized to prevent access or touching by a human hand but remain accessible to insects.

Referring now to FIG. 2, alternatively or additionally, in some implementations pesticides may be provided as a sole constituent or mixed with other additives, preservatives, diluents, or chemical pesticides. In some implementations, first pesticide 112 may comprise cinnamaldehyde ($C_9H_8O$), cinnamate ($C_{11}H_{12}O_2$), and cinnamic acid ($C_9H_{12}O_2$). Cinnamaldehyde ($C_9H_8O$) may have the following structure:

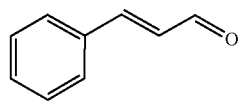

or the other isomer or mixtures thereof.

In certain implementations, cinnamate may be an ethyl cinnamate ($C_{10}H_{10}O_2$), in which case the structure is:

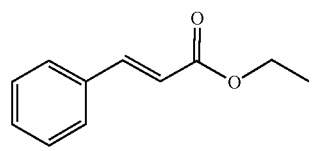

or the other isomer or mixtures thereof.

In certain implementations, cinnamate may be a methyl cinnamate ($C_{10}H_{10}O_2$), in which case the structure is:

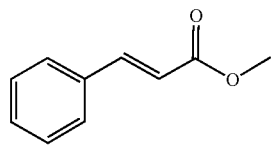

or the other isomer or mixtures thereof.

Referring to FIG. 2, additionally or alternatively, second pesticide 114 may include sodium chloride (NaCl), which may include common salts. In some implementations, third pesticide 116 may include sodium hypochlorite (NaClO), which is a bleaching agent. Referring again to FIG. 2, in some implementations of pesticide strip 10 fourth pesticide 118 may include 3,7-dimethyl-1-oxaspiro[3.5]nonane;3,6-dimethyl-4,5,6,7-tetrahydro-1-benzofuran; 5-methyl-2-propan-2-ylcyclohexan-1-ol;5-methyl-2-propan-2-ylcyclohexan-1-one;(5-methyl-2-propan-2-ylcyclohexyl) acetate;5-methyl-2-propan-2-ylidenecyclohexan-1-one ($C_{62}H_{108}O_7$), which is a peppermint oil.

In some implementations of pesticide strip 10, cinnamaldehyde ($C_9H_8O$), cinnamate ($C_{11}H_{12}O_2$), and/or cinnamic acid ($C_9H_8O_2$) may be present in an effective amount sufficient to kill ants. Additionally or alternatively, in some implementations of pesticide strip 10, sodium chloride (NaCl) may be present in an effective amount to kill termites. In certain implementations of pesticide strip 10, sodium hypochlorite (NaClO) may be present in an effective amount to kill roaches and spiders. In certain implementations of pesticide strip 10, $C_{62}H_{108}O_7$ targets spiders. Additionally or alternatively, in some implementations of pesticide strip 10, pesticides 106 further may comprise herbs, essential oils, attractants, or combinations thereof. Pesticides 106 may be nontoxic to mammals. Non-limiting examples of other insects or pests that may be deterred by the presently disclosed strip 10 include mosquitos, ticks, fleas, moths, and cockroaches.

In some implementations, pesticide strip 10 may be translucent. Additionally or alternatively, strip 10 may also be scented. The scents may include an odor that is either meant to be pleasing to a user or foul to provide a warning that a pesticide is present. The scent may also be one that is an attractant to pests, including insects.

Referring to FIG. 2, wells 110 may be refillable by a user after the target pests, including insects, has ingested, consumed, or interacted with pesticides 106 in a manner that renders the strip in need of refilling. Wells 110 further may be flexible plastic lumen 120 with openings 122 spaced sequentially to refill well 110 with pesticide. The flexible plastic lumen may be any of a variety of plastics, including but not limited to, polyurethane, polystyrene, polypropylene, polyvinyl chloride, high density polyethylene, low density polyethylene, and/or any combination thereof.

In some implementations, adhesive materials may include, but are not limited to, epoxies, cyanoacrylates, and certain urethanes and acrylic adhesives. In some implementations, adhesive 104 may be spray coated with a gel which is then fully cured in place. An adhesive layer may also be extruded onto tape 10 in a reel-to-reel process which thermally bonds the two layers together.

Methods of Use

In accordance with yet another aspect of the present disclosure, a method of pest abatement is described. The method may comprise, or consist essentially of, or yet further consist of adhering any of the pesticide strips described herein to a surface. The method may be used to kill any type of insect, including, but not limited to, ants, termites, spiders, cockroaches, silverfish, fleas, moths, or any combination thereof. The surface to which the pesticide strip may be adhered includes any of wood, cardboard, concrete, plastics, ceramics, glass, or any combinations thereof. In some implementations of the method, pesticide strip 10 further may be spooled on a rolling mechanism 124 configured for application of the strip 10 by rolling.

Strip 10 is designed to be applied to any two- or three-dimensional surface, including, but not limited to, floors, baseboards, boxes, pantries, overhangs, doorways, hanging objects (e.g., plants), and any object or surface to which an adhesive 104 may be applied.

In some implementations of the presently claimed methods, applicator 202 may be used to refill wells 110 with pesticides 106. In exemplary implementations, the pesticides that may be used to refill wells 110, include, but are not limited to, cinnamaldehyde ($C_9H_8O$), cinnamate ($C11H12O2$), cinnamic acid ($C9H8O2$), sodium chloride (NaCl), sodium hypochlorite (NaClO), and/or 3,7-dimethyl-1-oxaspiro[3.5]nonane;3,6-dimethyl-4,5,6,7-tetrahydro-1-benzofuran; 5-methyl-2-propan-2-ylcyclohexan-1-ol; 5-methyl-2-propan-2-ylcyclohexan-1-one; (5-methyl-2-propan-2-ylcyclohexyl) acetate;5-methyl-2-propan-2-ylidene-cyclohexan-1-one ($C62H108O7$).

Pesticide Kit

Figure 3:
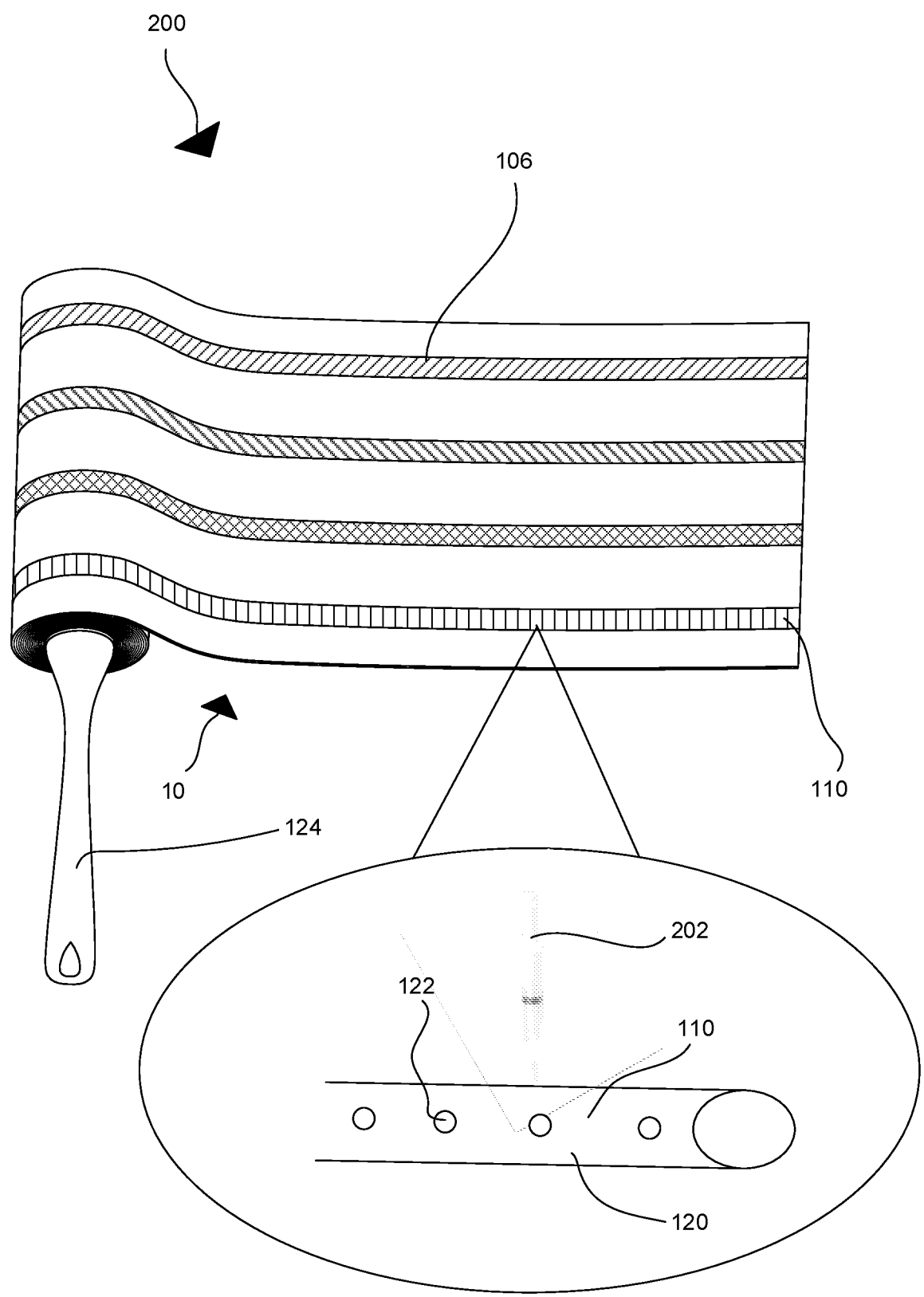
FIG. 3 illustrates one implementation of a pesticide kit comprising a pesticide strip, a rolling mechanism, and an applicator, wherein a well configured to contain pesticide is again shown in detail in the inset.

In accordance with yet another aspect of the present disclosure, a pesticide kit is described. Referring to FIG. 3, pesticide kit 200 may comprise, or consist essentially of, or yet further consist of strip 10 as described in any of the implementations disclosed herein and applicator 202 configured to distribute pesticides 106 into any of wells 110 for reuse of the strip upon consumption of the initial amount of pesticides.

Pesticide kit 200 further may include rolling mechanism 124 configured for application of the strip 10 to any surface by rolling. In some implementations, well 110 situated inside flexible plastic lumen 120 may be refilled through opening 122 using applicator 202. Applicator 202 is not sized proportionately in FIG. 3 to a true implementation of the applicator, but is reproduced there at a size to fit the image.

EXAMPLES

Example 1

This example will demonstrate the capability of the pesticide strip and kit of the present technology to destroy insect populations and prevent further infestations.

An exemplary pesticide tape of the present disclosure is tested as a potential supplier of stomach poisons to target insects. The pesticide tape described herein is applied to cardboard boxes in a storage facility. The pesticide tape, in a first application, comes preloaded with four pesticides in the wells: (i) a first pesticide of at least one of cinnamaldehyde (C9H8O), cinnamate (C11H12O2), and cinnamic acid (C9H8O2) to target ants; (ii) a second pesticide of sodium chloride (NaCl) to target termites; (iii) a third pesticide of sodium hypochlorite (NaClO) to target roaches and spiders; and (iv) a fourth pesticide of 3,7-dimethyl-1-oxaspiro[3.5]nonane;3,6-dimethyl-4,5,6,7-tetrahydro-1-benzofuran;5-methyl-2-propan-2-ylcyclohexan-1-ol; 5-methyl-2-propan-2-ylcyclohexan-1-one; (5-methyl-2-propan-2-ylcyclhexyl) acetate; 5-methyl-2-propan-2-ylidenecyclohexan-1-one (C62H108O7) to target spiders. An attractant is added to the pesticide including any of sugars, glucose solutions, molasses, residual solution containing sugar, 0.0-dimethyl-2,2,2-trichloro-1 hydroxy ethyl phosphonate) mixed with sugar, pheromones, plant volatiles, flower oils, sugars and/or proteins that mimic insect attraction systems found in nature.

It is expected that over a six week period any noticeable infestations of ants, termites, roaches, spiders, and/or other target pests will steadily dissipate as the target pests ingest, consume, or come in contact with the insecticides. It is further anticipated that as the pesticides are consumed, the surface (i.e., here a storage box) will remain protected and the insects will not be able to penetrate any potential breaches in the box's outer surface.

Upon complete consumption of the insecticides in the wells of the pesticide strip by the target pests, a user may refill the wells using an applicator supplied with the pesticide strip. The pesticides are common household items and so the pesticide strip advantageously is designed to be refilled without further trips to a specialty store or without the need for further online orders. It is expected that the pesticide strip of the present technology will be effective for as long as the adhesive adheres to the desired surface.

The method of this first example may be performed on other surfaces, including, as another exemplary surface, baseboards of a dwelling.

EQUIVALENTS

Unless otherwise defined, all technical and scientific terms used herein have the same meaning as commonly understood by one of ordinary skill in the art to which this technology belongs.

As utilized herein, "the terms approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

Thus, it should be understood that the materials, methods, and examples provided here are representative of preferred aspects, are exemplary, and are not intended as limitations on the scope of the present technology. It should be noted that the term "exemplary" and variations thereof, as used herein to describe various implementations, are intended to indicate that such implementations are possible examples, representations, or illustrations of possible implementations (and such terms are not intended to connote that such implementations are necessarily extraordinary or superlative examples).

The present technology has been described broadly and generically herein. Each of the narrower species and subgeneric groupings falling within the generic disclosure also form part of the present technology. This includes the generic description of the present technology with a proviso or negative limitation removing any subject matter from the genus, regardless of whether or not the excised material is specifically recited herein.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain implementations require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary implementations, and that such variations are intended to be encompassed by the present disclosure.

In addition, where features or aspects of the present technology are described in terms of Markush groups, those skilled in the art will recognize that the present technology is also thereby described in terms of any individual member or subgroup of members of the Markush group.

All publications, patent applications, patents, and other references mentioned herein are expressly incorporated by reference in their entirety, to the same extent as if each were incorporated by reference individually. In case of conflict, the present specification, including definitions, will control.

Other aspects are set forth within the following claims.

What is claimed:

1. A pest repellant apparatus, comprising:
a planar material having a first side and a second side;
an adhesive material disposed on at least one of the first side or the second side;
a plurality of plastic lumen strips arranged separately along a longitudinal axis of at least one of the first side or the second side, each of the plurality of plastic lumen strips comprising a plurality of sequentially spaced apart wells along the longitudinal axis; and
a plurality of pesticides arranged within the plurality of sequentially spaced apart wells along the longitudinal axis of each plastic lumen strip such that each of the plurality of plastic lumen strips contains a pesticide that targets a different pest.

2. The apparatus of claim 1, wherein each of the plurality of pesticides comprises an insecticide.

3. The apparatus of claim 1, wherein an effective amount of at least one of the plurality of pesticides is accessible, by an insect, from at least one of the plurality of wells.

4. The apparatus of claim 3, wherein the plurality of sequentially spaced apart wells are sized to prevent access or touching by a vertebrate organism but remain accessible to invertebrate organisms.

5. The apparatus of claim 3,
wherein the lumen is configured to refill the well with pesticide.

6. The apparatus of claim 1, wherein the plurality of pesticides comprises a first pesticide including at least one of cinnamaldehyde (C9H8O), cinnamate (C11H12O2), and cinnamic acid (C9H8O2).

7. The apparatus of claim 6, wherein the first pesticide targets ants.

8. The apparatus of claim 1, wherein the plurality of pesticides comprises a second pesticide including sodium chloride (NaCl).

9. The apparatus of claim 8, wherein the second pesticide targets termites.

10. The apparatus of claim 1, wherein the plurality of pesticides comprises a third pesticide including sodium hypochlorite (NaClO).

11. The apparatus of claim 10, wherein the third pesticide targets roaches.

12. The apparatus of claim 1, wherein the plurality of pesticides comprises a fourth pesticide including 3,7-dimethyl-1-oxaspiro[3.5]nonane;3,6-dimethyl-4,5,6,7-tetrahydro-1-benzofuran;5-methyl-2-propan-2-ylcyclohexan-1-ol;5-methyl-2-propan-2-ylcyclohexan-1-one; (5-methyl-2-propan-2-ylcyclohexyl) acetate;5-methyl-2-propan-2-ylidenecyclohexan-1-one (C62H108O7).

13. The apparatus of claim 12, wherein the fourth pesticide targets spiders.

14. The apparatus of claim 1, wherein the at least one of the plurality of pesticides comprises one or more of an herb, an essential oil, an attractant, or a combination or at least two thereof.

15. A pest repellant system, comprising:
a planar material having a first side and a second side;
an adhesive material disposed on at least one of the first side or the second side;
a plurality of plastic lumen strips arranged separately along a longitudinal axis of at least one of the first side or the second side, each of the plurality of plastic lumen strips comprising a plurality of sequentially spaced apart wells along the longitudinal axis;
a plurality of pesticides arranged within the plurality of sequentially spaced apart wells along the longitudinal axis of each plastic lumen strip such that each of the plurality of plastic lumen strips contains a pesticide that targets a different pest;
an applicator configured to distribute pesticides into the plurality of sequentially spaced apart wells for reuse.

16. The system of claim 15, further comprising:
a rolling mechanism associated with the applicator and configured to deploy the planar material by rolling.

* * * * *